(No Model.)
E. JONES.
MICROMETER SCALE.
No. 386,589. Patented July 24, 1888.
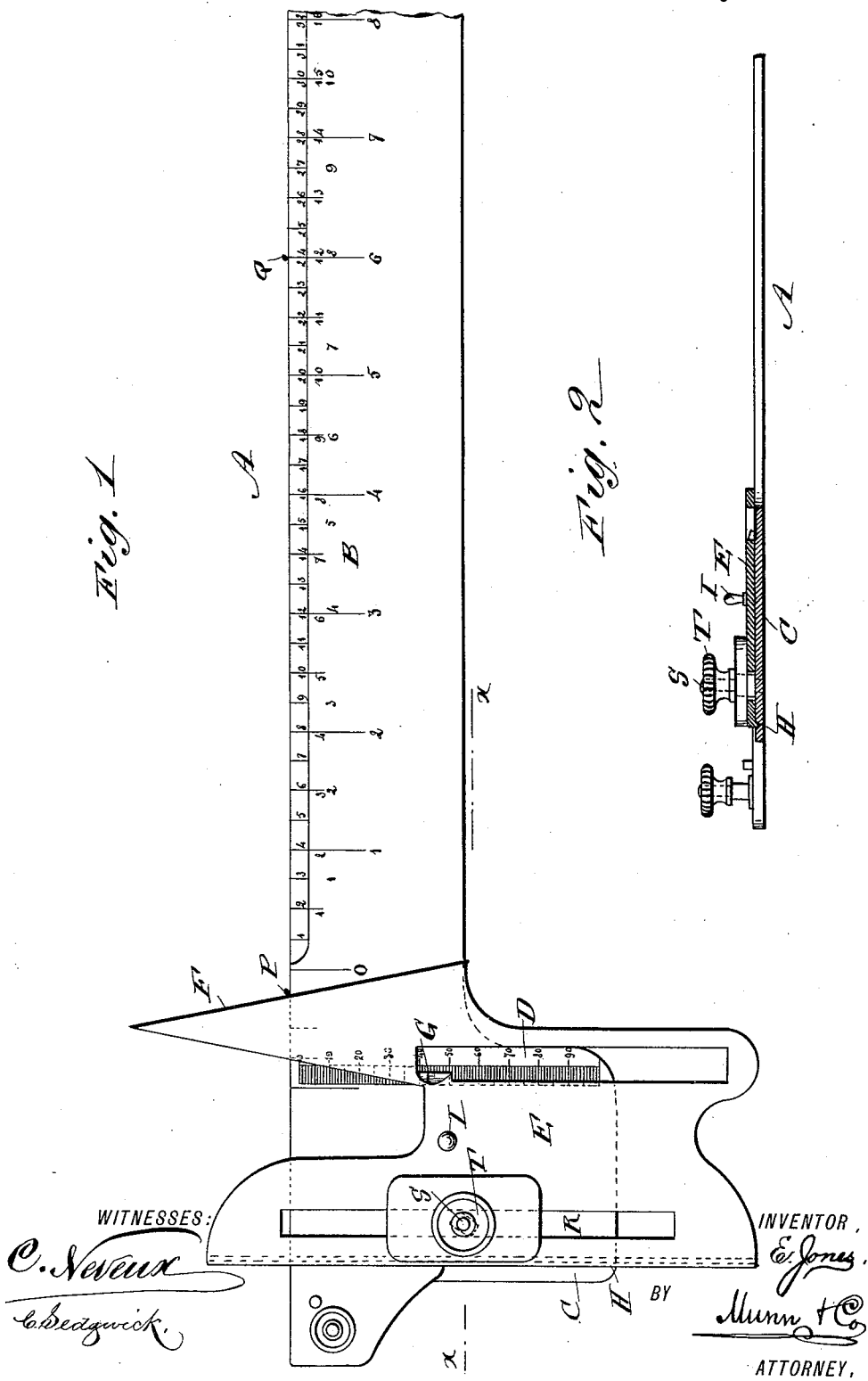
WITNESSES:
C. Neveux
C. Sedgwick.
INVENTOR,
E. Jones.
BY
Munn & Co.
ATTORNEY.

UNITED STATES PATENT OFFICE.

EDMUND JONES, OF COLD SPRING HARBOR, NEW YORK.

MICROMETER-SCALE.

SPECIFICATION forming part of Letters Patent No. 386,589, dated July 24, 1888.

Application filed November 25, 1887. Serial No. 256,098. (No model.)

*To all whom it may concern:*

Be it known that I, EDMUND JONES, of Cold Spring Harbor, in the county of Suffolk and State of New York, have invented a new and useful Improvement in Micrometer-Scales, of which the following is a full, clear, and exact description.

This invention relates to an improvement in scales for measuring or plotting distances, in which fractions of the unit of the scale are determinable by means of an auxiliary movable gage having a scale for determining the extent of its movement.

The object of the improvement is to secure greater simplicity, accuracy, and convenience in use than has been hitherto generally attained in devices of this character; and to this end the invention consists of a novel construction and combination of parts, substantially as hereinafter fully described, and as distinctly claimed.

Reference is to be had to the accompanying drawings, forming a part of this specification, in which similar letters of reference indicate corresponding parts in both the figures.

Figure 1 is a plan view of a micrometer-scale embodying my improvement; and Fig. 2 is a cross-sectional view of the said scale on the line *x x*, Fig. 1.

In constructing and using the micrometer-scale here shown a straight-edge, A, is provided with a longitudinal scale, B, which is divided, in this instance, into inches, halves, and quarters, numbered in regular order, as illustrated, and with an extension, C, projecting laterally from the back of the straight-edge A at the 0 end of the scale. On the face of the extension C is also provided a scale, D, in this case divided into one hundred parts and numbered accordingly, at right angles to the main scale B; and on the extension C is mounted to slide, by means of guides H parallel to the scale D, a gage, E, having a straight-edge, F, at an oblique angle with respect to the straight-edge A, an index, G, adapted to register with the divisions of the transverse scale D, and a handle, I, for moving it. The adjustment and arrangement are such that when the index G is moved from 0 to 100 of the scale D the oblique edge F will be correspondingly moved from coincidence with 0 of the longitudinal scale B backward to coincidence with a point at a distance from 0 of the scale B equal to the length of the unit chosen—in this case one-half inch—and consequently the distance between any half-inch division of the scale B and the point of coincidence of the oblique edge F and straight-edge A will be indicated by adding to the reading of the said division the number of hundredths indicated on the scale D by the index G. Consequently, to use the scale to measure the distance between two points, P and Q, the 0 of scale D is first brought in coincidence with the point P and the straight-edge A with the point Q. In case the point Q does not exactly coincide with a unit-division of the scale B, the scale is moved backward lengthwise to bring the first unit-division in advance of the point Q into coincidence therewith, and the gage then moved until its oblique edge registers with the point P, when the exact distance between the points will be indicated, as above stated.

The gage E has a slot, R, parallel to the scale D to receive a screw, S, rising from the extension C, and a nut, T, is screwed on the screw S for clamping the gage in position on the straight-edge.

Having thus fully described my invention, I claim as new and desire to secure by Letters Patent—

In a micrometer-scale, the combination, with a straight-edge having a longitudinal scale and a lateral extension having a transverse scale, of a gage mounted to work on the said extension on a transverse guide, and having an index adapted to register with the transverse scale, and an edge oblique to the said guide and adapted to register with the straight-edge, substantially as and for the purpose specified.

EDMUND JONES.

Witnesses:
G. WM. TOTTEN,
ANNIE L. WRIGHT.